US009965719B2

United States Patent
Choi et al.

(10) Patent No.: US 9,965,719 B2
(45) Date of Patent: May 8, 2018

(54) SUBCATEGORY-AWARE CONVOLUTIONAL NEURAL NETWORKS FOR OBJECT DETECTION

(71) Applicant: NEC Laboratories America, Inc., Princeton, NJ (US)

(72) Inventors: Wongun Choi, Lexington, MA (US); Yuanqing Lin, Sunnyvale, CA (US); Yu Xiang, Palo Alto, CA (US); Silvio Savarese, Stanford, CA (US)

(73) Assignee: NEC Corporation (JP)

( * ) Notice: Subject to any disclaimer, the term of this patent is extended or adjusted under 35 U.S.C. 154(b) by 0 days. days.

(21) Appl. No.: 15/342,823

(22) Filed: Nov. 3, 2016

(65) Prior Publication Data
US 2017/0124415 A1 May 4, 2017

Related U.S. Application Data

(60) Provisional application No. 62/250,790, filed on Nov. 4, 2015.

(51) Int. Cl.
*G06K 9/00* (2006.01)
*G06N 3/08* (2006.01)
(Continued)

(52) U.S. Cl.
CPC ............ *G06N 3/08* (2013.01); *G06K 9/3233* (2013.01); *G06K 9/628* (2013.01); *G06T 7/73* (2017.01);
(Continued)

(58) Field of Classification Search
USPC ........ 382/100, 103–107, 155–160, 162, 168, 382/173, 181, 190, 219, 224, 232, 254,
(Continued)

(56) References Cited

U.S. PATENT DOCUMENTS 9,202,144 B2 * 12/2015 Wang .................... G06K 9/4628
2011/0182469 A1 * 7/2011 Ji ........................ G06K 9/00335
382/103
(Continued)

OTHER PUBLICATIONS

Doll'ar, et. al. "Fast feature pyramids for object detection". Submission to IEEE Transactions on Pattern Analysis and Machine Intelligence. vol. 36, No. 8. Aug. 2014. pp. 1532-1545.
(Continued)

*Primary Examiner* — Seyed Azarian
(74) *Attorney, Agent, or Firm* — Joseph Kolodka

(57) ABSTRACT

A computer-implemented method for detecting objects by using subcategory-aware convolutional neural networks (CNNs) is presented. The method includes generating object region proposals from an image by a region proposal network (RPN) which utilizes subcategory information, and classifying and refining the object region proposals by an object detection network (ODN) that simultaneously performs object category classification, subcategory classification, and bounding box regression. The image is an image pyramid used as input to the RPN and the ODN. The RPN and the ODN each include a feature extrapolating layer to detect object categories with scale variations among the objects.

17 Claims, 5 Drawing Sheets

(51) Int. Cl.
*G06K 9/32* (2006.01)
*G06K 9/62* (2006.01)
*G06T 7/73* (2017.01)
*G06E 1/00* (2006.01)

(52) U.S. Cl.
CPC .............. *G06T 2207/20084* (2013.01); *G06T 2207/30261* (2013.01)

(58) Field of Classification Search
USPC ... 382/276, 286–291, 305, 312, 205; 706/15
See application file for complete search history.

(56) References Cited

U.S. PATENT DOCUMENTS

2011/0222724 A1* 9/2011 Yang .................. G06K 9/00248
382/103
2014/0376819 A1* 12/2014 Liu ...................... G06K 9/3233
382/205
2015/0117760 A1* 4/2015 Wang ...................... G06K 9/66
382/157

OTHER PUBLICATIONS

Felzenszwalb, et al., "Cascade object detection with deformable part models". In Proceedings of the IEEE Computer Vision and Pattern Recognition. CVPR, 2010. pp. 2241-2248.
Ross Girshick, "Fast r-cnn". arXiv preprint arXiv:1504.08083. Computer Vision and Pattern Recognition. Apr. 30, 2015. pp. 1-9.
Girshick, et al., "Rich feature hierarchies for accurate object detection and semantic segmentation". The IEEE Conference on Computer Vision and Pattern Recognition. CVPR, 2014. pp. 580-587.
He, et al., "Spatial pyramid pooling in deep convolutional networks for visual recognition". Submission to IEEE Transactions on Pattern Analysis and Machine Intelligence. vol. 37, No. 9. Sep. 2015. pp. 1904-1916.
Xiang, et al., "Data-driven 3d voxel patterns for object category recognition". Computer Vision and Pattern Recognition. CVPR, 2015. pp. 1903-1911.

* cited by examiner

SUBCATEGORY-AWARE CONVOLUTIONAL NEURAL NETWORKS FOR OBJECT DETECTION

RELATED APPLICATION INFORMATION

This application claims priority to Provisional Application No. 62/250,790, filed on Nov. 4, 2015, incorporated herein by reference in its entirety.

BACKGROUND

Technical Field

The present invention relates to image processing and, more particularly, to subcategory-aware convolutional neural networks for object detection.

Description of the Related Art

Convolutional Neural Networks (CNNs) have become dominating in solving different recognition problems, such as image classification, object detection, and image description generation. CNNs are powerful due to their capability in both representation and learning. With millions or even billions of weights in contemporary CNNs, CNNs are able to learn much richer representations from data compared to traditional "non-CNN" methods.

SUMMARY

A computer-implemented method for detecting objects by using subcategory-aware convolutional neural networks (CNNs) is presented. The method includes generating object region proposals from an image by a region proposal network (RPN) which utilizes subcategory information, and classifying and refining the object region proposals by an object detection network (ODN) that simultaneously performs object category classification, subcategory classification, and bounding box regression.

A system for detecting objects by using subcategory-aware convolutional neural networks (CNNs) is presented. The system includes a memory and a processor in communication with the memory, wherein the processor is configured to generate object region proposals from an image by a region proposal network (RPN) which utilizes subcategory information, and classify and refine the object region proposals by an object detection network (ODN) that simultaneously performs object category classification, subcategory classification, and bounding box regression.

A non-transitory computer-readable storage medium comprising a computer-readable program for training a convolutional neural network (CNN) is presented, wherein the computer-readable program when executed on a computer causes the computer to perform the steps of generating object region proposals from an image by a region proposal network (RPN) which utilizes subcategory information, and classifying and refining the object region proposals by an object detection network (ODN) that simultaneously performs object category classification, subcategory classification, and bounding box regression.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
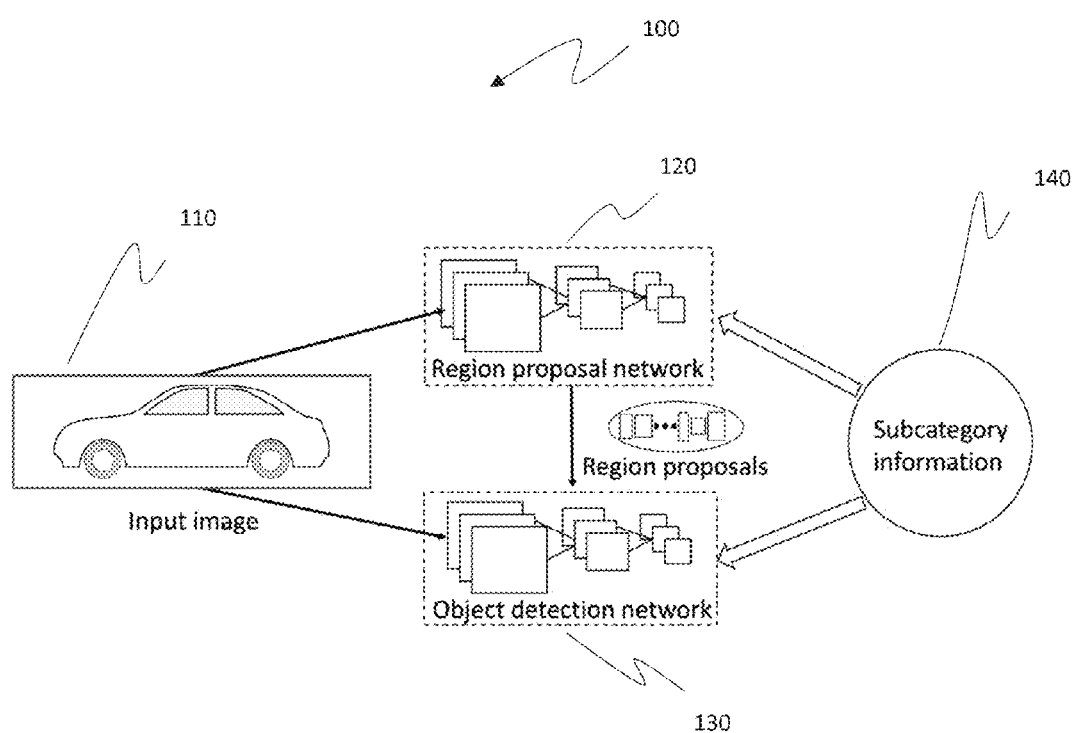
FIG. 1 is an example block/flow diagram of a subcategory-aware convolutional neural network (CNN) illustrating a region proposal network and an object detection network, in accordance with embodiments of the present invention.

Embodiments of the present invention provide for a region proposal network (RPN) that uses subcategory information to guide the proposal generating process, and a object detection network (ODN) for joint category classification, subcategory classification, and bounding box regression. In addition, the present invention proposes using an image pyramid for convolutional neural network (CNN)-based detection. Experiments are conducted on the KITTI (Karlsruhe Institute of Technology and Toyota Technological Institute at Chicago) detection benchmark for detecting car, pedestrian and cyclist in outdoor scenes, where state-of-the-art performance on both object detection and object orientation estimation are achieved.

In addition, the present invention proposes a method and system for solving visual object detection given an image. The goal is to identify the object of interest (e.g., car, pedestrian, etc.) and estimate the location of such object in the image space. CNN methods are adopted to learn the representation of the object and improve it by exploring the concept of subcategories. The key challenge is to recognize the object accurately while being efficient.

The present invention further proposes subcategory-aware CNNs for object detection. The detection method operates in the two-stage detection pipeline. In the first stage, a set of region proposals are generated from an image. In the second stage, these region proposals are classified with their locations refined for detection. For region proposal generation, a RPN is proposed, which utilizes subcategory information to guide the region generating process. Motivated by the traditional object detection methods that train a template or a detector for each subcategory, a subcategory convolutional (conv) layer is introduced in the RPN, where each filter in the conv layer captures a subcategory. The subcategory conv layer outputs heat maps regarding the presence of a certain subcategory at a specific location and scale. Using these heat maps, the RPN is able to output confident subcategory detections as region proposals. For region proposal classification and refinement, an ODN is introduced by injecting subcategory information into a Fast R-CNN network. The detection network is able to perform object category classification, subcategory classification, and bounding box regression jointly or simultaneously. In addition, in both the RPN and the detection CNN, image pyramids are used as input, and a new feature extrapolating layer is introduced to efficiently compute conv features in multiple scales. In this way, the method is able detect object categories with significant scale variations among the objects.

The present invention further proposes a method composed of two steps: 1) using a region proposal network and 2) using an object detection network given the region proposals. The method uses the concept of subcategories (i.e., group of examples that shares similar appearance characteristics, e.g., cars with frontal view point, people standing or walking, etc.) to learn a compact representation of the objects. In the first step, a CNN method is learned that can propose object regions directly from an image. The subcategory-aware convolutional filters are learned to predict the possible location of the target objects in the image. In this step, many false-positive boxes may be generated. However, the goal is not to miss any true-positives. In the second step, given the candidate box proposals, each region is evaluated by using the subcategory-aware classification model. In contrast to the region proposal network, this model may have much more complex classification model, which may take a longer time, but produce high quality detection results. Therefore, the subcategory information is exploited to learn better object proposal and object detection models.

One main challenge in object category detection is how to handle the appearance change of objects in images due to different factors, such as intra-class variability, object pose variation, scale change, occlusion, truncation, and so on. In traditional object detection methods, training a holistic model to handle all these challenging factors is overwhelming. Therefore, the concept of subcategory is introduced.

Instead of building one model for a category, mixture of models are constructed, with each model capturing a subcategory. For example, in the Deformable Part Model (DPM), a mixture of HOG templates is trained for each category, where each template captures objects with a specific range of aspect ratios. In the 3D Voxel Pattern (3DVP) representation, each 3DVP captures objects with similar pose, occlusion and truncation, and a detector is trained for each 3DVP. As can be seen from these examples, subcategory has been utilized in traditional object detection methods in a "divide and conquer" manner, and the concept is general beyond nameable subcategories (e.g., "sedan" is a subcategory of "car"). However, subcategory has not been fully explored in CNN-based object detection methods.

The exemplary embodiments of the present invention propose subcategory-aware CNNs for object detection. A CNN architecture is presented in FIG. 1 for generating region proposals for detection using subcategory information, and a new network for joint detection and subcategory classification.

Referring now in detail to the figures in which like numerals represent the same or similar elements and initially to FIG. 1, a subcategory-aware convolutional neural network (CNN) including for object detection is shown, in accordance with embodiments of the present invention. The subcategory-aware CNN 100 includes an image 110 that is processed by the region proposal network (RPN) 120 and the object detection network (ODN) 130. The region proposal network (RPN) 120 and object detection network (ODN) 130 may utilize subcategory information 140.

Specifically, the detection method operates in the two-stage pipeline. In the first stage, a set of region proposals are generated from an image. In the second stage, these region proposals are classified with their locations refined for detection.

For region proposals, bottom-up segmentation-based methods are widely used. However, these methods are not able to handle objects in complex scenes with significant scale variations, such as in autonomous driving. Thus, the exemplary embodiments of the present invention propose a RPN, which utilizes subcategory information to guide the region generating process. Motivated by the traditional object detection methods that train a template or a detector for each subcategory, a subcategory convolutional (conv) layer is introduced in the RPN, where each filter in the conv layer is trained discriminatingly for subcategory detection. The subcategory conv layer outputs heat maps regarding the presence of certain subcategories at a specific location and scale. Using these heat maps, the RPN is able to output confident subcategory detections as region proposals.

For region proposal classification and refinement, a new object detection network is introduced by injecting subcategory information into a Fast R-CNN network. The detection network is able to perform object category classification, subcategory classification, and bounding box regression jointly or simultaneously. In addition, in both the RPN and the detection CNN, image pyramids as used as input, and a new feature extrapolating layer is introduced to efficiently compute conv features in multiple scales. In this way, the method of the present invention is able to detect object categories with significant scale variations.

Experiments are conducted on the KITTI detection benchmark to evaluate the detection framework, as discussed further below. By discovering subcategories according to the orientation of an object, the method of the present invention is able to jointly or simultaneously detect an object and estimate the object's orientation.

Regarding subcategory in object detection, subcategory has been widely utilized to facilitate object detection and different methods of discovering object subcategories have been proposed. In deformable part models (DPM), subcategories are discovered by clustering objects according to the aspect ratio of their bounding boxes. Studies have been conducted that perform clustering according to the viewpoint of object to discover subcategories. Visual subcategories are constructed by clustering in the appearance space of an object. 3D voxel pattern (3DVP) performs clustering in the 3D voxel space according to the visibility of the voxels, which jointly models object pose, occlusion, and truncation.

Regarding CNN-based object detection, the conventional CNN-based object detection methods can be categorized into two classes: one-stage detection methods and two-stage detection methods. In one-stage detection, a CNN directly processes an input image and outputs bounding boxes of object detections. In two-stage detection, region proposals are first generated from an input image, where different region proposal methods can be employed. Then these region proposals are fed into a CNN for classification and location refinement. The exemplary embodiments of the present invention adopt the two-stage detection framework, where the region proposal process can be considered to be the coarse detection step in a coarse-to-fine detection method.

In recent CNN-based object detection methods, region proposal techniques are utilized to generate a set of object candidates from each image. These object candidates, or region proposals, are classified by a CNN to solve the object detection problem. Ideally, the region proposal approach covers objects in an input image with as few proposals as possible. Since objects in images appear at different locations and different scales, region proposal itself is a challenging issue, especially in complex scenes.

Figure 2:
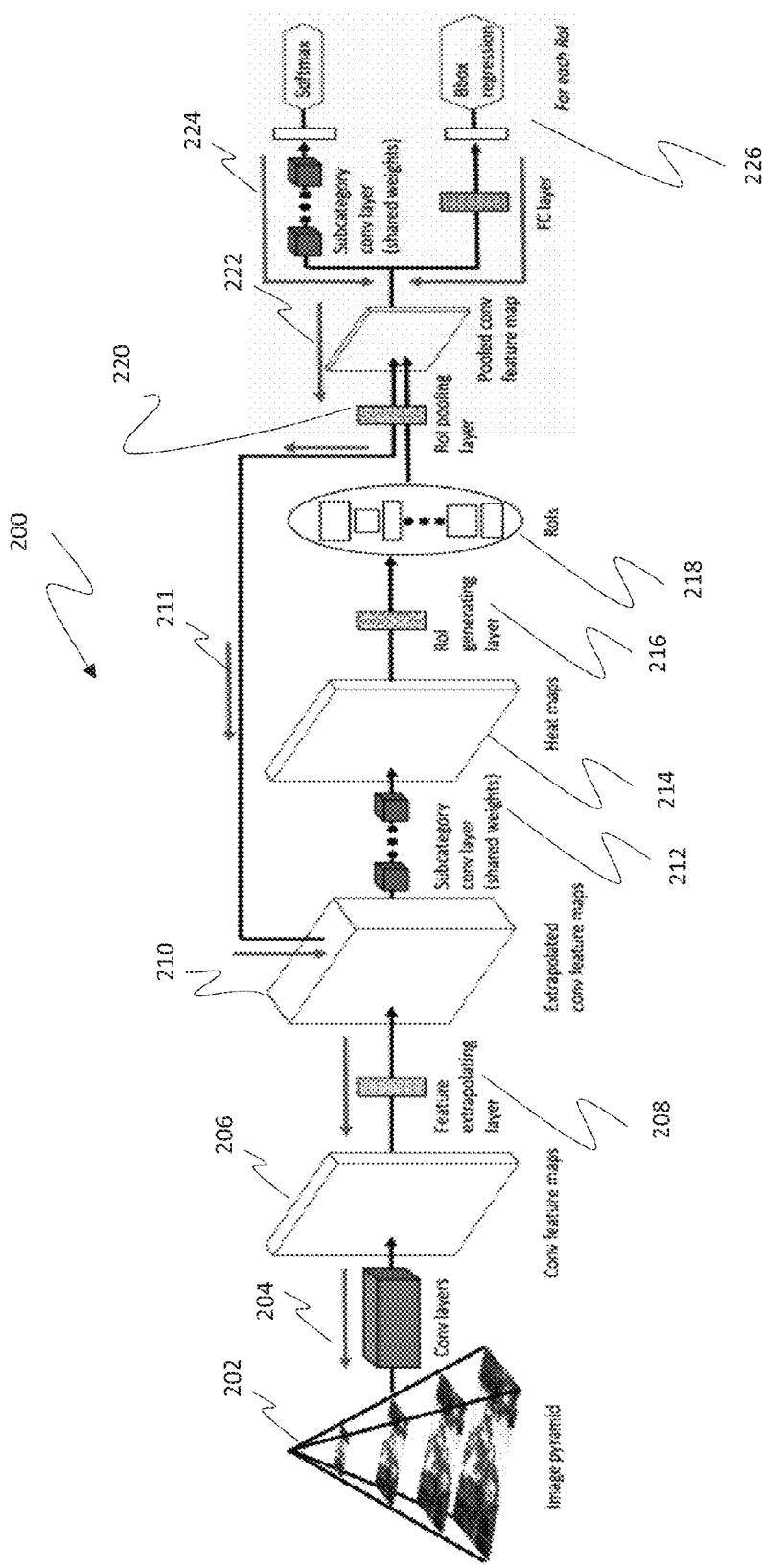
FIG. 2 is a block/flow diagram of an example region proposal network, in accordance with embodiments of the present invention.

A network architecture is presented for generating object proposals from images. The architecture is inspired by the traditional sliding-window-based object detectors, such as the Aggregated Channel Feature (ACF) detector and the Deformable Part Model (DPM). FIG. 2 illustrates the architecture of the region proposal network.

The region proposal network (RPN) 200 includes a pyramid image 202, convolution layers 204, convolution feature maps 206, a feature extrapolation layer 208, extrapolated conversion feature maps 210, a subcategory conversion layer 212, heat maps 214, an RoI generating layer 216, generated RoIs 218, an RoI pooling layer 220, a pooled conversion feature map 222, another subcategory conversion layer 224, and two final layers 226, one that outputs softmax probability estimates over object subcategories, and another layer that refines the RoI location with a bounding box regressor.

To handle different scales of objects, the image pyramid 202 is inputted into the RPN 200, which is first processed by several convolutional (conv) and max pooling layers 204 to extract the conv feature maps 206 of the image 202, with one conv feature map for each scale. In order to speed up the computation of conv features on the image pyramid 202, the feature extrapolating layer 208 is introduced, which generates feature maps 210 for scales that are not covered by the image pyramid with extrapolation. After computing the extrapolated conv feature maps 210, the conv layer 212 for object subcategory detection is designed, where each filter in the conv layer corresponds to an object subcategory. The filters are trained to make sure they fire on correct locations and scales of objects in the corresponding subcategories during training of the network 200.

The subcategory conv layer 212 outputs heat map 214 for each scale, where each location in the heat map 214 indicates the confidence of an object in the corresponding location, scale, and subcategory. Using the subcategory heat maps 214, the RoI generating layer 216 is designed that generates object candidates (RoIs) 218 by thresholding the heat maps. The RoIs 218 are used in the RoI pooling layer 220 to pool conv features from the extrapolated conv feature maps 222. Finally, the RPN 200 terminates at two sibling layers 226, one that outputs softmax probability estimates over object subcategories, and another layer that refines the RoI location with a bounding box regressor.

In the RPN 200, fixed-size conv filters are used in the subcategory conv layer to localize objects (e.g., 5×5 conv filters). In order to handle different scales of objects, image pyramids 202 are used. Image pyramid 202 consists of images with different resolutions obtained by rescaling the original image according to different sampled scales. After constructing the image pyramid 202 for an input image, multi-resolution conv feature maps 206 can be computed by applying several conv layers and max pooling layers 210 to each image in the pyramid (FIG. 2). If convolution is performed on every scale explicitly, it is computationally expensive, especially when a finely-sampled image pyramid is needed as in the region proposal process. In recent studies, it has been demonstrated that multi-resolution image features can be approximated by extrapolation from nearby scales, rather than being computed explicitly. As a result, the exemplary embodiments of the present invention introduce the feature extrapolating layer 208 to accelerate the computation of conv features on the image pyramid 202.

Specifically, a feature extrapolating layer takes as input N feature maps that are supplied by the last conv layer for feature extraction, where N equals to the number of scales in the inputted image pyramid. Each feature map is a multi-dimensional array of size H×W×C, with H rows, W columns, and C channels. The width and height of the feature map corresponds to the largest scale in the image pyramid, where images in smaller scales are padded with zeros in order to generate feature maps with the same size. The feature extrapolating layer constructs feature maps at intermediate scales by extrapolating features from the nearest scales among the N scales, where bilinear interpolation is used.

Suppose M intermediate scales are added between every ith scale and (i+1)th scale, i=1, . . . , N−1, the output of the feature extrapolating layer is N'=(N−1)M+N feature maps, each with size H×W×C. Since extrapolating a multi-dimensional array is much faster than computing a conv feature map explicitly, the feature extrapolating layer speeds up the feature computation on image pyramids while using less memory.

After computing the conv feature maps, the subcategory conv layer is designed for subcategory detection. Motivated by the traditional object detection methods that train a classifier or a template for each subcategory, a conv filter in the subcategory conv layer is trained to detect a specific subcategory. Suppose there are K subcategories to be considered, then the subcategory conv layer consists of K+1 conv filters with one additional conv filter for a special "background" category. For multi-class detection (e.g., car, pedestrian, cyclist, etc.), the K subcategories are the aggregation of all the subcategories from all the classes. These conv filters operate on the extrapolated conv feature maps, and output heat maps that indicate the confidences of the presence of objects in the input image. Fixed-size conv filters are used in this layer (e.g., 5×5×C conv filters), which are trained to fire on specific scales in the feature pyramid.

The RoI generating layer takes as input N' heat maps, and outputs a set of region proposals (RoIs), where N' equals to the number of scales in the feature pyramid after extrapolation. Each heat map is a multi-dimensional array of size H×W×K for K subcategories (i.e., for RoI generating, the "background" channel in the heat map is ignored). The RoI generating layer first converts each heat map into a H×W 2D array by max pooling over the channels for subcategory. Then it thresholds the 2D heat map to generate RoIs. Thus, the objectness of a region is measured by aggregating information from subcategories. Different generating strategies are used in testing and training.

In testing, each location (x,y) in a 2D heat map with a score larger than a predefined threshold is used to generate RoIs. First, a canonical bounding box centered on (x,y) with width and height the same as that of the conv filters (e.g., 5×5) in the subcategory conv layer is generated, which has an aspect ratio of 1. Second, a number of bounding boxes centered on (x,y) with the same area as the canonical box (e.g., 25) but different aspect ratios are generated. Finally, the RoI generating layer rescales the generated boxes according to the scale of the heat map. In this way, these RoIs can cover objects in different scales and aspect ratios.

In training, the RoI generating layer outputs hard positive RoIs and hard negative RoIs for training the subcategory conv filters, given a budget on batch size in stochastic gradient descent. First, the same procedure as described in testing is used to generate a number of bounding boxes for each location in each heat map. Second, according to the ground truth bounding boxes of objects in a training image, the intersection over union (IoU) overlap is computed between the generated boxes and the ground truth boxes. Bounding boxes with IoU overlap larger/smaller than some threshold (e.g., 0.5) are considered to be positive/negative.

Finally, given the number of RoIs to be generated for each training image R (i.e., batch size divided by the number of images in a batch), the RoI generating layer outputs R×α hard positives (i.e., R×α positive bounding boxes with lowest scores in the heat maps) and R×(1−α) hard negatives (i.e., R×(1−α) negative bounding boxes with highest scores in the heat maps), where α∈(0, 1) is the percentage of positive examples.

After generating RoIs, the RoI pooling layer is applied to pool conv features for each RoI. Then the pooled conv features are used for two tasks: subcategory classification and bounding box regression. As illustrated in FIG. 2, the RPN 200 has two sibling output layers 226. The first layer outputs a discrete probability distribution: $p=(p_0, \ldots, p_K)$, over K+1 subcategories, which is computed by applying a softmax function over the K+1 outputs of the subcategory conv layer. The second layer outputs bounding box regression offsets:

$$t^{k'}=(t_x^{k'},t_y^{k'},t_w^{k'},t_h^{k'}), k'=0,1,\ldots,K' \text{ for}$$

for K' object classes (K'<<K). The method parameterizes $t^{k'}$, which specifies a scale-invariant translation and log-space width/height shift relative to a RoI. The method employs a multi-task loss to train the RPN for joint subcategory classification and bounding box regression:

$$L(p,k^*,k'^*,t,t^*)=L_{subcls}(p,k^*)+\lambda[k'^*\geq 1]L_{loc}(t,t^*)$$

where k* and k'* are the truth subcategory label and the true class label respectively, $L_{subcls}(p,k^*)=-\log p_{k^*}$ is the standard cross-entropy loss, and $$t^*=(t_x^*,t_y^*,t_w^*,t_h^*)$$

is the true bounding box regression targets for class k'*, and $$t=(t_x,t_y,t_w,t_h)$$

is the prediction for class k'*.

The method uses the smoothed $L_1$ loss for the bounding box regression loss $L_{loc}(t,t^*)$. The indicator function $[k'^*\geq 1]$ indicates that bounding box regression is ignored if the RoI is background (i.e., k'*=0). λ is a predefined weight to balance the two losses.

In training, derivatives from the loss function are back-propagated. Arrows 211 in FIG. 2 indicate the route for backpropagation. The two subcategory conv layers in the RPN 200 share their weights. These weights or conv filters are updated according to the derivatives from the softmax loss function for subcategory classification. In this way, the method is able to train these filters for subcategory detection. There is no derivative flow in computing heat maps using the subcategory conv layer and in the RoI generating layer.

After the region proposal process, CNNs are utilized to classify these proposals and refine their locations. Since region proposal significantly reduces the search space in object detection (e.g., several thousand regions per image), more powerful CNNs can be used in the detection step, which usually contain several fully connected layers with high dimensions. In the following section, the subcategory-aware object detection network is introduced, where subcategory information is used to facilitate object detection and accomplish the task of joint detection and subcategory classification.

Figure 3:
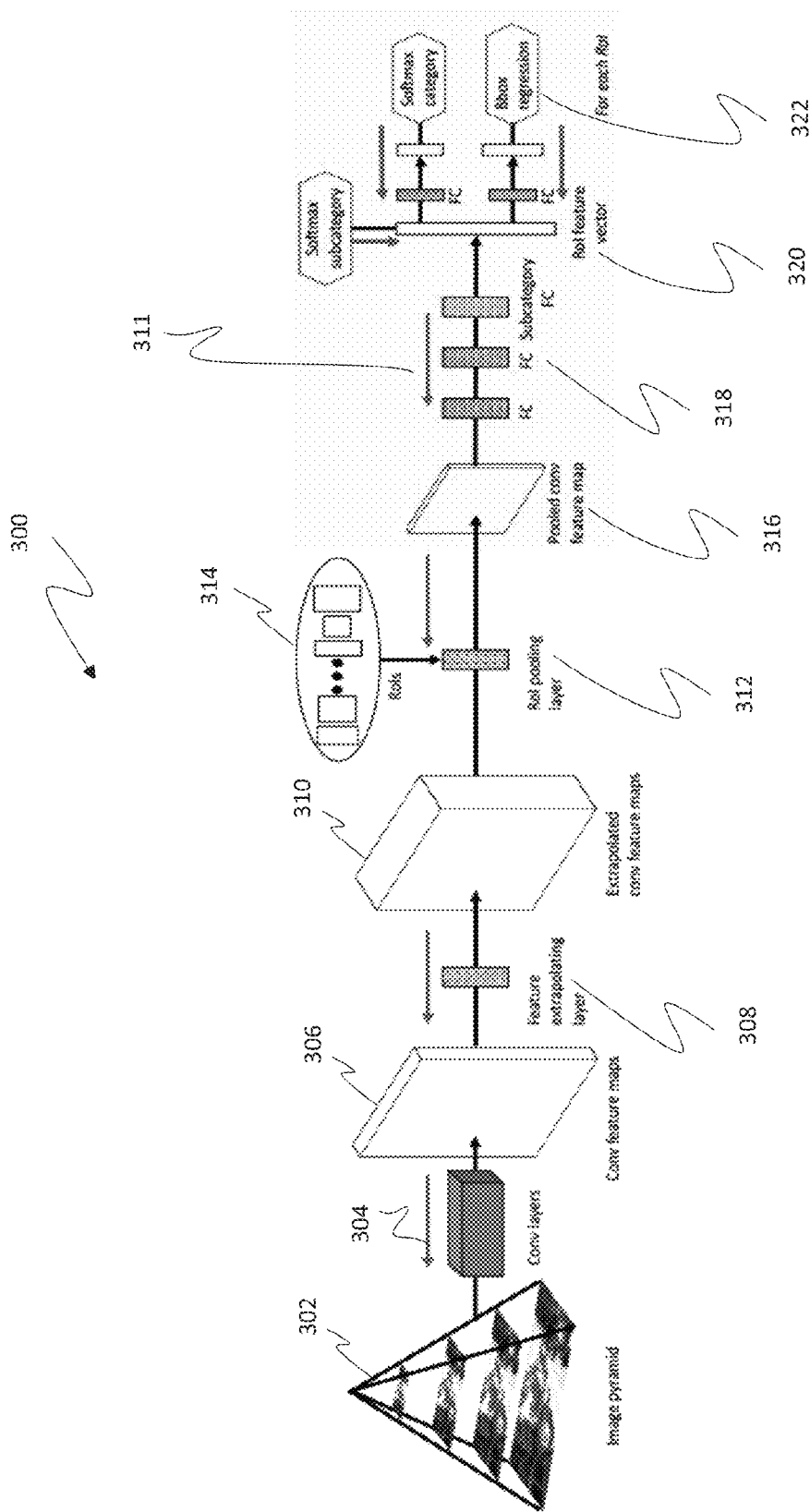
FIG. 3 is a block/flow diagram of an example object detection network, in accordance with embodiments of the present invention.

FIG. 3 illustrates the architecture of the object detection network 300. The network 300 includes a pyramid image 302, convolution layers 304, convolution feature maps 306, a feature extrapolation layer 308, extrapolated conversion feature maps 310, an RoI pooling layer 312, RoIs 314, a pooled conversion feature map 316, subcategory FC (fully connected) layers 318, RoI feature vector 320, and three final layers 322, two that output softmax probability estimates over object subcategories, and another layer that refines the RoI location with a bounding box regressor.

The network 300 is constructed based on a Fast R-CNN detection network. The exemplary embodiments of the present invention use image pyramids 302 to handle the scale variation of objects. After the last conv layer 304 for feature extraction, the feature extrapolating layer 308 is added to increase the number of scales in the conv feature pyramid. Given the region proposals generated from the RPN, a RoI pooling layer 312 is employed to pool conv features for each RoI from the corresponding conv feature map 306. The pooled conv features 316 are fed into three fully connected (FC) layers 318, where the last FC layer is designed for subcategory classification. For K subcategories, the "subcategory FC" layer outputs a K+1 dimensional vector with one additional dimension for the background class. The output, named RoI feature vector 320, is considered to be an embedding in the subcategory space. Finally, the detection network 300 terminates at three output layers 322. The first output layer applies a softmax function directly on the output of the "subcategory FC" layer for subcategory classification. The other two output layers operate on the RoI feature vector, and apply FC layers for object class classification and bounding box regression.

The method trains the object detection network 300 with a multi-task loss for joint object class classification, subcategory classification, and bounding box regression:

$$L(p,k^*,p',k'^*,t,t^*)=L_{subcls}(p,k^*)+\lambda_1 L_{cls}(p',k'^*)+\lambda_2 [k'^*\geq 1]L_{loc}(t,t^*)$$

where $p=(p_{=0}, \ldots, p_K)$ is a probability distribution over K+1 subcategories, $$p'=(p_0', \ldots, p_{K'}')$$

is a probability distribution over K'+1 object classes, k* and k'* are the truth subcategory label and the true class label respectively, t and t* are the predicted vector and the true vector for bounding box regression respectively, and $\lambda_1$ and $\lambda_2$ are predefined weights to balance the losses of different tasks. $L_{subcls}(p,k^*)=-\log p_{k^*}$ and $L_{cls}(p',k'^*)=-\log p'_{d'^*}$ are the standard cross-entropy loss, and $L_{loc}(t,t^*)$ is the smoothed $L_1$ loss as in the RPN 200 (FIG. 2). In backpropagation training, derivatives for the multi-task loss are back-propagated to the previous layers. Arrows 311 in FIG. 3 indicate the route of the derivative flow.

Figure 4:
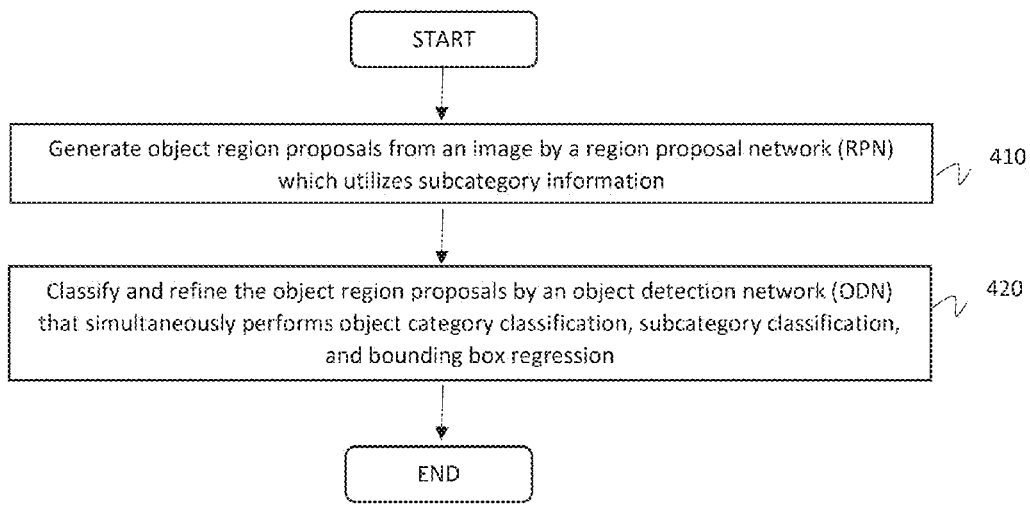
FIG. 4 is a block/flow diagram of a method for detecting objects by using subcategory-aware convolutional neural networks (CNNs), in accordance with embodiments of the present invention.

FIG. 4 is a block/flow diagram of a method for training a convolutional neural network (CNN), in accordance with embodiments of the present invention.

At block 410, object region proposals are generated from an image by a region proposal network (RPN) which utilizes subcategory information.

At block 420, the object region proposals are classified and refined by an object detection network (ODN) that simultaneously performs object category classification, subcategory classification, and bounding box regression.

The advantages of the exemplary embodiments of the present invention are that (i) the system and method make the whole pipeline simpler by removing the need of using additional region proposal mechanisms, which is often a necessary module in modern object detection methods, and (ii) the subcategory-aware CNN method generates more accurate detection accuracy compared to the other conventional methods.

In experiments, the object detection framework is applied to the KITTI detection benchmark. The KITTI dataset consists of video frames from autonomous driving scenes. There are 7,481 images for training, and 7,518 images for testing. Three object categories are annotated and evaluated for object detection, i.e., car, pedestrian and cyclist. Since the ground truth annotations of the KITTI test set are not released, the KITTI training images are split into a train set and a validation set to conduct analyses regarding the detection framework. Splitting is followed such that it ensures that there are no images from the same video across the train set and the validation set. The train set contains 3,682 images, while the validation set has 3,799 images. Table 1 summarizes the statistics on the KITTI training set.

TABLE 1

Statistics on the KITTI training set.

|  | #images | #cars | #pedestrians | #cyclists |
|---|---|---|---|---|
| Train set | 3,682 | 14,898 | 3,154 | 916 |
| Validation set | 3,799 | 13,714 | 1,333 | 711 |
| Total | 7,481 | 28,612 | 4,487 | 1,627 |

As suggested by the KITTI detection benchmark, the detection framework is evaluated at three levels of difficulty, i.e., easy, moderate and hard, where the difficulty is measured by the minimal scale of the object to be considered, and the occlusion and truncation of the object. Average Precision (AP) is used to measure the detection performance, where 70%, 50%, and 50% overlap threshold is adopted by the KITTI benchmark for car, pedestrian and cyclist, respectively. To evaluate joint detection and orientation estimation, a new metric called Average Orientation Similarity (AOS) is used, which evaluates the orientation similarity between detections and ground truths at different detection recalls.

Different approaches can be utilized to discover subcategories for the three categories in KITTI, such as clustering based on object appearance or clustering based on aspect ratio of the object bounding box. Specifically, in the present implementation, the 3D Voxel Pattern (3DVP) representation for a car is adopted, which jointly models object pose, occlusion, and truncation in the clustering process. Each 3DVP is considered to be a subcategory for car. For pedestrian and cyclist, clustering according to the orientation of the object is performed, and each cluster is considered to be a subcategory.

In this way, the method is able to estimate the orientation of the object by conducting subcategory classification in the framework, where the orientation of the subcategory is transferred to the detected object. For validation on the KITTI dataset, the method used 173 subcategories (125 3DVPs for car, 24 poses for pedestrian and cyclist each), while for testing on the KITTI dataset, the method used 275 subcategories (227 3DVPs for car, 24 poses for pedestrian and cyclist each). Correspondingly, the subcategory conv layer in the RPN 200 and the subcategory FC layer in the detection network 300 have an output number that equals to the number of subcategory plus one.

In the RPN 200, 5 scales were used in the input image pyramid (0.25, 0.5, 1.0, 2.0, 3.0), where each number indicates the rescaling factor with respect to the original image size. The feature extrapolating layer extrapolates 4 scales with equal intervals between every two input scales. Thus, the final conv feature pyramid has 21 scales. In the RoI generating layer, each location in a heat map generate 7 boxes with 7 different aspect ratios (3.0, 2.0, 1.5, 1.0, 0.75, 0.5, 0.25), where each number indicates the ratio between the height and the width of the bounding box. In training the RPN 200, each SGD mini-batch is constructed from a single image, chosen uniformly at random. A mini-batch has size 128, with 64 positive RoIs and 64 negative RoIs, where the IoU threshold is 70%.

In the detection network 300, 4 scales are used in the input image pyramid (1.0, 2.0, 3.0, 4.0), with 4 scales extrapolated between every two scales. In total, the method had a 16-scale conv feature pyramid. Each SGD mini-batch is constructed from 2 images. A mini-batch has size 128, with 64 RoIs from each image. 25% of the RoIs are positive, where the IoU threshold is 70%, 50%, 50% for car, pedestrian and cyclist, respectively. The same SGD hyper-parameters are used for both region proposal and detection.

In conclusion, the systems and method of the present invention explored how subcategory information can be exploited in CNN-based object detection. A novel region proposal network and a novel object detection network were proposed, where subcategory information was explicitly employed to improve region proposal, object detection, and orientation estimation. The subcategory-aware CNNs can also handle the scale variation of objects using image pyramids in an efficient way. Extensive experiments were conducted on the KITTI detection benchmark.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
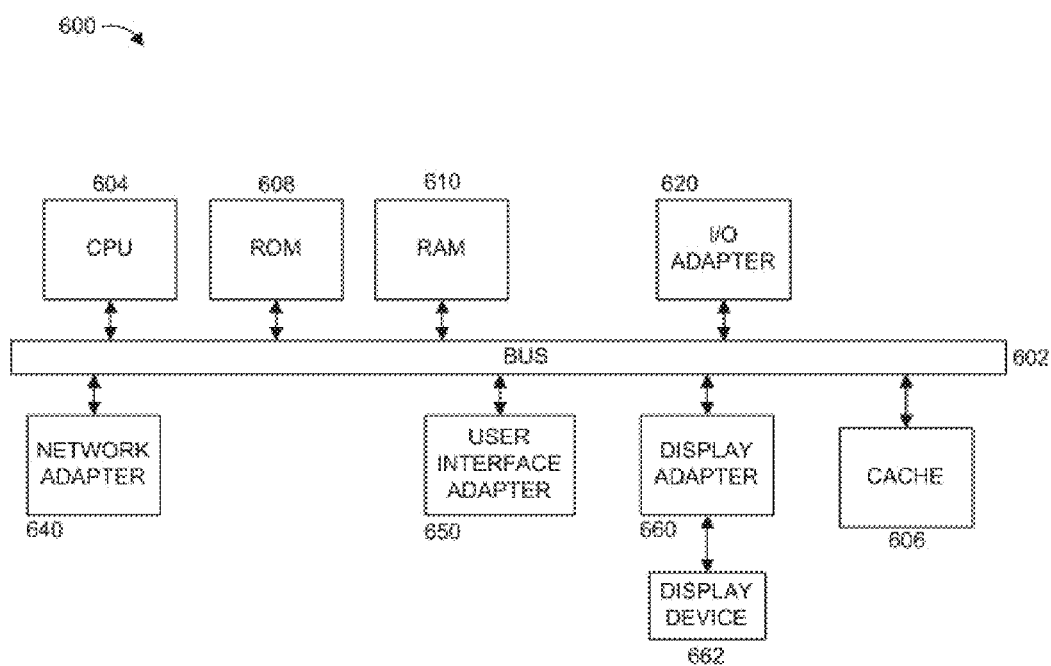
FIG. 5 is a block diagram of a processing system, in accordance with embodiments of the present invention.

Referring now to FIG. 5, an exemplary processing system 600 is shown. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 640, a user interface adapter 650, and a display adapter 660, are operatively coupled to the system bus 602. A display device 662 can be operatively coupled to system bus 602 by display adapter 660.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for detecting objects by using subcategory-aware convolutional neural networks (CNNs), the method comprising:
    generating object region proposals from an image by a region proposal network (RPN) which utilizes subcategory information; and
    classifying and refining the object region proposals by an object detection network (ODN) that simultaneously performs object category classification, subcategory classification, and bounding box regression,
    wherein the RPN and the ODN each include a feature extrapolating layer to detect object categories with scale variations among the objects.

2. The method of claim 1, wherein the image is an image pyramid used as input to the RPN and the ODN.

3. The method of claim 1, wherein the RPN includes a subcategory convolution layer such that each filter in the convolution layer corresponds to an object subcategory.

4. The method of claim 3, wherein the subcategory convolution layer outputs heats maps indicating a presence of subcategories at a specific location and a specific scale.

5. The method of claim 4, wherein the heat maps are used to create a region of interest (RoI) generating layer for generating object candidates by thresholding the heat maps.

6. The method of claim 5, wherein the RPN terminates at two layers, one layer that outputs softmax probability estimates over object subcategories and another layer that refines RoI location with a bounding box regressor.

7. A system for detecting objects by using subcategory-aware convolutional neural networks (CNNs), the system comprising:
    a memory; and
    a hardware computer processor operatively coupled to the memory, the processor being configured for:
        generating object region proposals from an image by a region proposal network (RPN) which utilizes subcategory information; and
        classifying and refining the object region proposals by an object detection network (ODN) that simultaneously performs object category classification, subcategory classification, and bounding box regression,
        wherein the RPN and the ODN each include a feature extrapolating layer to detect object categories with scale variations among the objects.

8. The system of claim 7, wherein the image is an image pyramid used as input to the RPN and the ODN.

9. The system of claim 7, wherein the RPN includes a subcategory convolution layer such that each filter in the convolution layer corresponds to an object subcategory.

10. The system of claim 9, wherein the subcategory convolution layer outputs heats maps indicating a presence of subcategories at a specific location and a specific scale.

11. The system of claim 10, wherein the heat maps are used to create a region of interest (RoI) generating layer for generating object candidates by thresholding the heat maps.

12. The system of claim 11, wherein the RPN terminates at two layers, one layer that outputs softmax probability estimates over object subcategories and another layer that refines RoI location with a bounding box regressor.

13. A non-transitory computer-readable storage medium comprising a computer-readable program for detecting objects by using subcategory-aware convolutional neural networks (CNNs), wherein the computer-readable program when executed on a computer, using a hardware computer processor coupled to the non-transitory computer-readable storage medium, causes the computer to perform the steps of:
    generating object region proposals from an image by a region proposal network (RPN) which utilizes subcategory information; and
    classifying and refining the object region proposals by an object detection network (ODN) that simultaneously performs object category classification, subcategory classification, and bounding box regression,
    wherein the RPN and the ODN each include a feature extrapolating layer to detect object categories with scale variations among the objects.

14. The non-transitory computer-readable storage medium of claim 13, wherein the image is an image pyramid used as input to the RPN and the ODN.

15. The non-transitory computer-readable storage medium of claim 13, wherein the RPN includes a subcategory convolution layer such that each filter in the convolution layer corresponds to an object subcategory.

16. The non-transitory computer-readable storage medium of claim 15, wherein the subcategory convolution layer outputs heats maps indicating a presence of subcategories at a specific location and a specific scale.

17. The non-transitory computer-readable storage medium of claim 16, wherein the heat maps are used to create a region of interest (RoI) generating layer for generating object candidates by thresholding the heat maps.

* * * * *